(12) United States Patent
Aoyagi et al.

(10) Patent No.: US 6,815,100 B2
(45) Date of Patent: Nov. 9, 2004

(54) CONTROL DEVICE FOR STARTING FUEL CELL VEHICLE

(75) Inventors: Satoshi Aoyagi, Wako (JP); Yoshinobu Hasuka, Wako (JP); Hibiki Saeki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 438 days.

(21) Appl. No.: 09/871,673

(22) Filed: Jun. 4, 2001

(65) Prior Publication Data

US 2001/0051291 A1 Dec. 13, 2001

(30) Foreign Application Priority Data

Jun. 12, 2000 (JP) .................................. 2000-176030

(51) Int. Cl.[7] ............................................... H01M 8/10
(52) U.S. Cl. ............................ 429/13; 429/22; 429/23
(58) Field of Search ........................... 429/12, 13, 17, 429/22, 23

(56) References Cited

U.S. PATENT DOCUMENTS 6,495,277 B1 * 12/2002 Edlund et al. ................. 429/22
2002/0136939 A1 * 9/2002 Grieve et al. ................. 429/23

* cited by examiner

Primary Examiner—Randy Gulakowski
Assistant Examiner—M. Wills
(74) Attorney, Agent, or Firm—Arent Fox PLLC

(57) ABSTRACT

A control device for starting a fuel cell is provided which is capable of preventing an excessive reduction of the terminal voltage of the fuel cell. A primary precharge portion, provided with a high voltage switch and a current limiter, is disposed at the output portion of a power storage unit, and a secondary precharge portion, provided with a DC-DC chopper and a control portion, is disposed at the output side of a fuel cell. The primary precharge portion controls the output current to flow in a path via a resistor having a predetermined resistance. The secondary precharge portion controls an output current of the fuel cell based on a current command value IFCCMD for the fuel cell.

1 Claim, 4 Drawing Sheets

CONTROL DEVICE FOR STARTING FUEL CELL VEHICLE

BACKGROUND OF THE INVENTION

1. Field of the Invention

The present invention relates to a control device for starting a fuel cell vehicle, and in particular, relates to a technique for starting the fuel cell in a hybrid-type power source device provided with a power storage unit for assisting a power supply from the fuel cell.

2. Description of the Related Art

Conventionally, a hybrid-type fuel cell power generation system is known, which comprises a fuel cell and a power storage unit such as a battery or a capacitor (electric double layer capacitor or condenser) in order to compensate the output responsiveness of the fuel cell, which is driven by a fuel gas supply. The fuel cell vehicle is installed with a solid polymer-type fuel cell, which is composed of a plurality of cells, each of which is formed by sandwiching a solid polymer electrolyte membrane corresponding to a solid polymer ion exchange membrane between an anode and a cathode.

In the above conventional hybrid-type fuel cell power generation system, when starting the fuel cell, first, air is supplied to a pressure control valve at the fuel side, for example, and fuel gas is supplied to the fuel electrode in response to air pressure supplied to the pressure control valve.

Thus, before starting the fuel cell, the power storage unit supplies electric driving power to the compressor which supplies air. In addition to auxiliary devices for driving the fuel cell, the power storage unit supplies electric power to the motor for driving the vehicle when the vehicle starts immediately after the start of the fuel cell, so that the power stored in the power storage unit is reduced, and the voltage between both terminals of the power storage unit is reduced.

When the fuel cell is connected to the power storage unit, whose voltage between both terminals has been reduced, a large current rapidly flows from the fuel cell to the power storage unit. In the course of translating the voltage between both terminals of the fuel cell and the power storage unit into a balanced state, the voltage between both terminals of the fuel cell is reduced. Then, the fuel cell is in danger of losing hydrogen or the water content in the solid polymer electrolyte film, or of experiencing a decrease in the durability of the fuel cell.

As described above, if the fuel cell is connected to the capacitor under a condition that the terminal voltage of the capacitor greatly differs from the terminal voltage of the fuel cell (output voltage of the fuel cell) at the time, for example, of starting the fuel cell, a large current may flow, which may cause a danger that the performance or the durability of the fuel cell will become deteriorated.

SUMMARY OF THE INVENTION

In the conventional fuel cell power source device, when the fuel cell is being started, air is first supplied to the pressure control valve for supplying fuel, and fuel supply is started in response to the air pressure supplied to the pressure control valve.

Thus, prior to activation of the fuel cell, a driving electric power is supplied to the fuel supply device such as an air compressor. In addition to the activation of the fuel cell driving auxiliary machines and various control devices, electric power is supplied from the capacitor to the propulsion motor, which is driven immediately after starting the fuel cell vehicle, which results in reducing the capacitor energy causing depression of the terminal voltage of the capacitor.

If the capacitor, in which terminal voltage has been depressed, and the fuel cell are connected, a large current flows from the fuel cell towards the capacitor, the terminal voltage of the fuel cell is reduced in the course of recovering both terminal voltages of the fuel cell and the capacitor to an equilibrium voltage. When the terminal voltage of the fuel cell is depressed, the performance or the long-term stability of the fuel cell are in risk of being deteriorated, or hydrogen and water in the solid polymer electrolyte membrane are in danger of being evaporated.

As described above, when the fuel cell and the capacitor are connected to each other under conditions that the terminal voltage of the capacitor is far below the terminal voltage of the fuel cell, a large current flows from the fuel cell to the capacitor, which may cause a danger to the performance and long-term stability of the fuel cell will be deteriorated.

The present invention was made in order to solve the above problems and an object of the present invention is to provide a control device for starting the fuel cell vehicle and which is capable of preventing an excessive reduction of the voltage between both terminals of the fuel cell.

One aspect of the present invention provides a control apparatus for starting a fuel cell vehicle comprising: a fuel cell (for example, a fuel cell 11 in the embodiment) supplying electric power to a load (for example, driving motor 13, PDU 14, and air compressor 15, etc. in the embodiment); a capacitor (for example, power storage unit 12 in the embodiment) for assisting the supply of electric power to the load and for storing generated energy of the fuel cell; a fuel cell driving device (for example, air compressor 15 in the embodiment) for supplying reaction gases (for example, hydrogen gas and air in the embodiment) and for driving the fuel cell; and a current limiting device (for example, a secondary precharge circuit 17 in the embodiment) for limiting an output current (for example, output current Ifc in the embodiment) from the fuel cell; wherein, at the time of starting the fuel cell, the capacitor supplies electric energy to the fuel cell driving device and the current limiting device prohibits the fuel cell from outputting an output current until an output voltage (for example, output voltage Vfc in the embodiment) of the fuel cell reaches a predetermined voltage, and, after the output voltage rises to more than the predetermined voltage (for example, $V_{MOT} \approx Vst \approx Vfc$ in the embodiment), the current limiting device limits the output current of the fuel cell to below a predetermined current value until the difference between the output voltage of the fuel cell and a terminal voltage of the capacitor (for example, terminal voltage Vst in the embodiment) reaches a predetermined voltage difference (for example, predetermined voltage difference $\Delta V$ in the embodiment).

According to the above constitution of the control apparatus for starting a fuel cell vehicle, since the output current of the fuel cell is limited at the time of starting the fuel cell, it is possible to prevent the terminal voltage of the fuel cell from reducing rapidly.

That is, at the time of starting the fuel cell, air is supplied to the pressure control device for supplying fuel to the fuel electrode of the fuel cell in addition to the air electrode of the fuel cell. In this case, the capacitor supplies electric power to the fuel cell driving device and the terminal voltage of the capacitor reduces. By providing a primary precharge circuit, which is provided with a resistor having a relatively high resistance, the capacitor can output a limited current to the fuel cell driving device or the power drive unit of the driving motor through the resistor, to thereby prevent the fuel cell from generating large output current.

In the above case, the DC-DC chopper prohibits the output current flowing from the fuel cell until the output voltage of the fuel cell reaches a predetermined voltage, and, the DC-DC chopper limits the output current flowing from the fuel cell, even after the output voltage of the fuel cell has been reached to a predetermined voltage, thereby, it is possible for a large current to flow from the fuel cell to the capacitor.

The above mechanism prevents a large current from flowing from the fuel cell to the capacitor until the voltage difference between the terminal voltage of the fuel cell and the terminal voltage of the capacitor become less than a predetermined value. Thus, in that period, the capacitor is gradually charged by a limited current from the fuel cell, and the terminal voltage of the capacitor approaches to the terminal voltage of the fuel cell. Therefore, it is possible to prevent evaporation of water or hydrogen from the solid polymer electrolyte membrane of the fuel cell and also to prevent the fuel cell from losing long-term stability, which contributes to maintain the performance and long-term stability.

By the use of the DC-DC chopper as a current limiting device, it becomes possible to control the output current of the fuel cell by changing a duty ratio of a pulse current which is input for controlling the chopping operation, and to reduce a time period until both terminal voltages of the fuel cell and the capacitor attain an equilibrium while preventing a rapid drop of the terminal voltage of the fuel cell.

The second aspect of the present invention provides a fuel cell power source system comprising: a fuel cell for supplying electric power to a load, an electric power storage device for assisting supply of electric power to the load, and a switching device (for example, a DC-DC chopper 17a in the embodiment), disposed between the fuel cell and the capacitor, for switching connection or disconnection of the fuel cell with the capacitor; and a control device (for example, a control portion 17b in the embodiment) for controlling the switching device, wherein when the fuel cell is being connected to the capacitor, the control device detects the voltage difference between a terminal voltage of the capacitor (for example, a terminal voltage of the capacitor Vst in the embodiment) and a terminal voltage of the fuel cell (for example, a terminal voltage of the fuel cell Vfc in the embodiment), when the voltage difference is larger than a predetermined value, the control device executes a chopping control of the switching device.

The third aspect of the present invention provides a fuel cell power source system comprising: a fuel cell for supplying electric power to a load, a capacitor for assisting supply of electric power to the load, a connecting device (for example, a DC-DC chopper 17a and a current limiting device 16b in the embodiment), disposed between an output end of the fuel cell and the capacitor, for connecting an output end of the fuel cell and the capacitor, and a control device (for example, a control device 17b and a fuel cell control device 32 in the embodiment) for controlling the connecting device as to whether the fuel cell is connected or disconnected with the capacitor, wherein when the fuel cell is being connected to the capacitor, the control device detects the voltage difference between the terminal voltage of the fuel cell (for example, a terminal voltage of the fuel cell Vfc in the embodiment) and the terminal voltage of the capacitor (for example, a terminal voltage of the capacitor Vst in the embodiment), and when the voltage difference is larger than a predetermined value, the control device controls the connecting device so as to limit an amount of a current (for example, an output current Ifc in the embodiment) flowing from the fuel cell to the capacitor.

The fourth aspect of the present invention provides the fuel cell power source system, wherein the control device connects the fuel to the capacitor after the fuel cell has been activated.

The fifth aspect of the present invention provides a fuel cell power source system which comprises a control device comprising a primary precharge circuit (for example, a primary precharge circuit 16 in the embodiment), disposed downstream of the capacitor, comprising a switching device (for example, a switching device 16a in the embodiment) and a current limiting device (for example, a current limiting device 16b in the embodiment), and a secondary precharge circuit (for example, a secondary precharge circuit 17 in the embodiment), disposed downstream of the fuel cell, comprising a chopping device (for example, a DC-DC chopping device 17a in the embodiment) and a chopper control device (for example, a chopper control device 17b in the embodiment), wherein when the voltage difference between the terminal voltage of the fuel cell and the terminal voltage of the capacitor exceeds a predetermined value, the current limiting device of the primary precharge circuit and the DC-DC chopper of the secondary precharge circuit control an amount of current flowing from the fuel cell flowing to the capacitor, and when a voltage difference between the terminal voltage of the fuel cell and the terminal voltage of the capacitor is reduced below the predetermined value, the primary precharge circuit and the secondary precharge circuit allow current flowing from the fuel cell to the capacitor and to the load.

As shown in FIG. 3, the control apparatus includes a DC-DC chopper 17a, in which ON/OFF of the transistor TR is controlled by supplying a pulse current to the base of the transistor. The control device 17b changes the duty ratio of the pulse current (the ratio of ON/OFF) so as to extend the OFF state of the transistor.

The sixth aspect of the present invention provides a method for controlling start of a fuel cell vehicle, the fuel cell having a fuel cell provided with a fuel cell driving device for supplying electric power to a load, an electric power storage device for assisting supply of electric power to the load, the control apparatus for controlling the fuel cell power source system having a primary precharge circuit disposed downstream of the capacitor, comprising a switching device and a current limiting device; and a secondary precharge circuit disposed downstream of the capacitor, comprising a DC-DC chopper and a chopper control device, the control method comprising the steps of opening the switching device of the primary precharge circuit when the terminal voltage of the capacitor and the terminal voltage of the load reach an equilibrium voltage after supplying a limited current from the capacitor through the current limiting device (for example, a current limiting device 16b in the embodiment), activating the fuel cell by activating the fuel cell driving device by supplying fuel to the fuel cell, detecting a voltage difference between the terminal voltage of the fuel cell and the terminal voltage of the capacitor, executing a chopping control of the output current of the fuel cell by the DC-DC chopper when the voltage difference exceeds a predetermined value when the voltage difference is reduced to be less than a predetermined value, and supplying the output current from the fuel cell to the load when the voltage difference is reduced below a predetermined value.

The seventh aspect of the present invention provides a method of controlling a fuel cell power source system, the fuel cell power source system having a fuel cell provided with a fuel cell driving device for supplying electric power to a load, a capacitor for assisting supply of electric power to a load including a driving motor, and a control apparatus for controlling the fuel cell power source system having a primary precharge circuit disposed downstream of the capacitor, comprising a switching device and a current limiting device; and a secondary precharge circuit disposed downstream of the capacitor, comprising a DC-DC chopper and a chopper control device, wherein the control method comprises the steps of detecting a voltage difference between a terminal voltage of the capacitor and a terminal voltage of the fuel cell, limiting the output current of the fuel cell by the DC-DC chopper of the secondary precharge circuit when the voltage difference exceeds a predetermined value, and opening the secondary precharge circuit to supply the output current from the fuel cell to the capacitor and to the load when the second voltage difference reduces to be less than a second predetermined difference.

The fuel cell control device 32 outputs a rotation number command value N as the driving order to the auxiliary devices and also controls the primary and secondary precharge circuits 16 and 17, and controls the contact points of relays provided at the high voltage switch 16a and current limiting device 16 in the primary precharge circuit 16 and also outputs the current command value IFCCMD as the switching command for the chopper 17 so as to make the DC-DC chopper in the secondary precharge circuit execute the chopping control of the output current. This chopping control of the output current controls the time period for the terminal voltages of both the capacitor and the fuel cell to reach an equilibrium. Moreover, the chopping control by the DC-DC chopper easily limits the current generated by the fuel cell by changing the duty ratio of the pulse current, so that it is possible to reduce the time period until both terminal voltages of the fuel cell and the capacitor reach an equilibrium voltage.

DETAILED DESCRIPTION OF THE INVENTION

Figure 1:
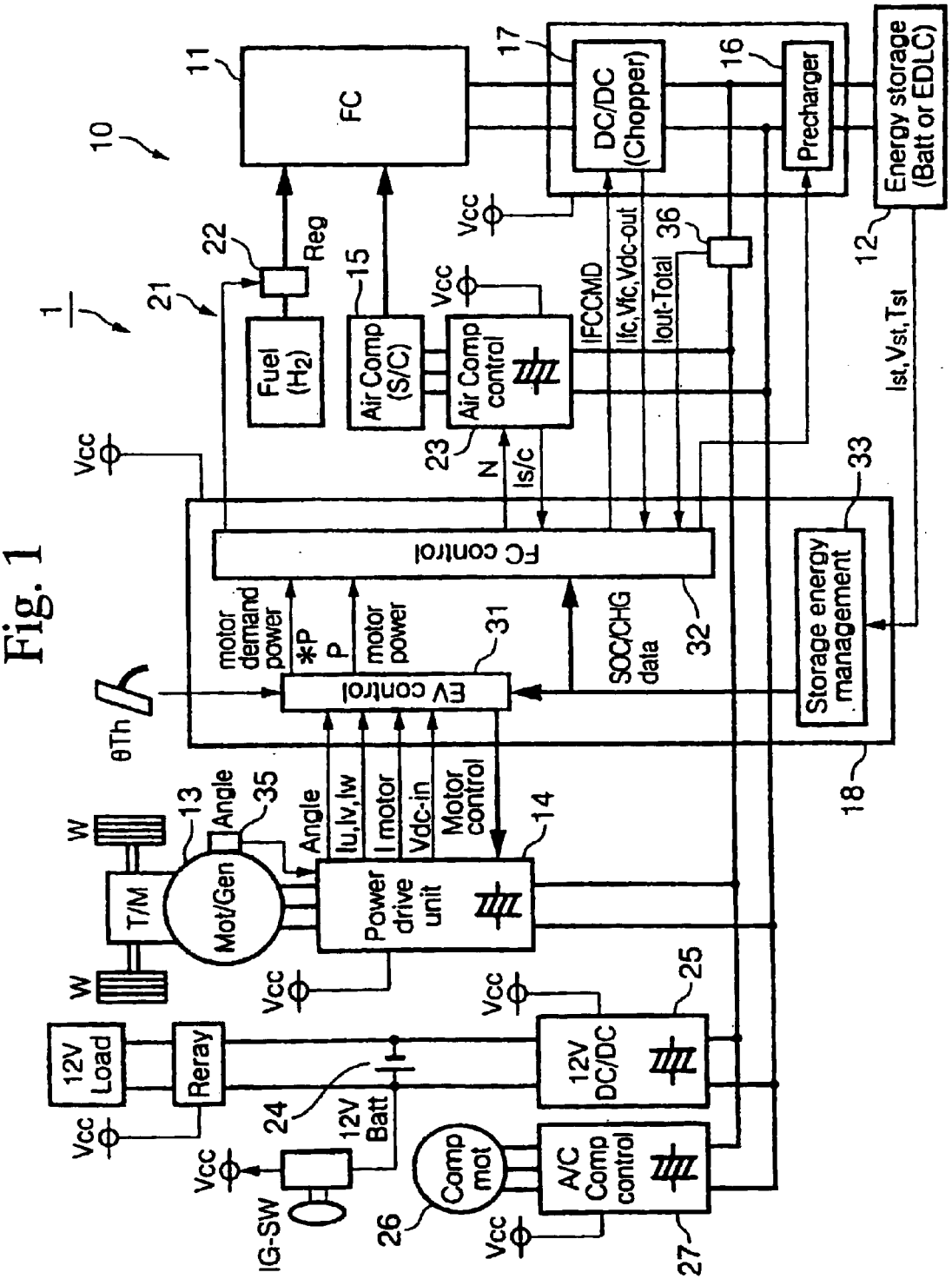
FIG. 1 is a diagram showing the structure of a fuel cell vehicle provided with a control device for starting the fuel cell vehicle.
Figure 2:
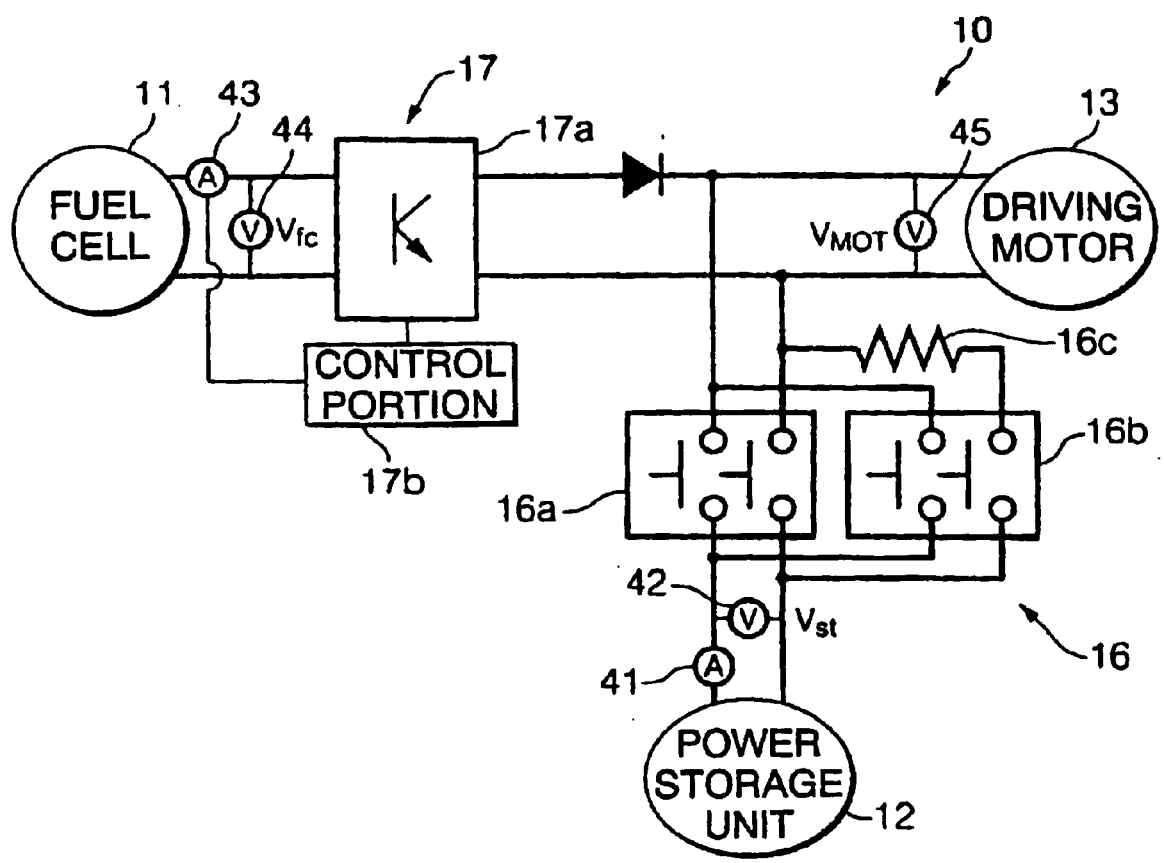
FIG. 2 is a diagram showing the main structure of a control device for starting the fuel cell vehicle shown in FIG. 1.
Figure 3:
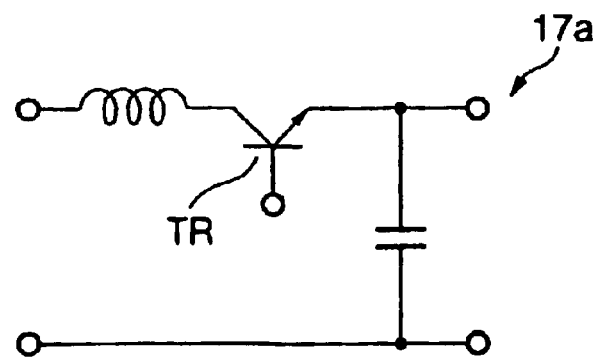
FIG. 3 is a diagram showing a constitution of a DC-DC chopper.

Hereinafter, an embodiment of a control device for starting the fuel cell vehicle is described with reference to the attached drawings. FIG. 1 is a diagram showing the structure of a fuel cell vehicle provided with a control device for starting the fuel cell vehicle. FIG. 2 is a diagram showing the main structure of a control device for starting the fuel cell vehicle shown in FIG. 1. FIG. 3 is a diagram showing a constitution of a DC-DC chopper.

A fuel cell vehicle 1 of this embodiment is provided with a hybrid-type power source device including a fuel cell 11 and a power storage unit 12, and a driving motor 13 for driving the vehicle generates driving power by receiving energy from the power source device; the driving power generated by the motor is transmitted to the driving wheels through a transmission T/M, which is constituted by either one of an automatic transmission or a manual transmission. When the driving power is transmitted from the driving wheels to the driving motor 13 during deceleration of the fuel cell vehicle, the driving motor acts as a generator and generates what is called regenerative braking power, and the kinetic energy of the vehicle is recovered as electric energy.

A control device 10 for starting the fuel cell vehicle according to the present embodiment comprises, for example, a fuel cell 11, a power storage unit 12, a driving motor 13, a PDU (Power Drive Unit) 14, an air compressor 15 as one of the auxiliary devices of the fuel cell, a primary precharge portion 16, a secondary precharge portion 17, and an ECU 18.

The driving motor 13 is formed of a permanent magnet type three-phase AC (alternating current) motor utilizing, for example, a permanent magnet as a field system, and the driving motor is controlled by three-phase AC power supplied by the PDU 14.

The PDU 14 is provided with a PWM inverter constituted by a switching element such as an IGBT and the like, and the PDU 14 converts a DC voltage output from the fuel cell 11 and the power storage unit 12 into three-phase AC power to be supplied to the driving motor 13.

The fuel cell 11 is constituted by a stack of cells, each of which is formed by sandwiching both side surfaces of a solid polymer electrolyte film between an anode and a cathode, and the fuel cell comprises a hydrogen electrode, to which hydrogen is supplied as a fuel, and an air electrode, to which air containing oxygen as an oxidizing agent is supplied. The fuel cell 11 is constituted such that hydrogen ions, generated by a catalytic reaction at the anode, pass the solid polymer electrolyte film and reach the cathode, wherein the hydrogen ions generate electric power by an electrochemical reaction with oxygen.

A fuel supply portion 21 connected to the fuel electrode side of the fuel cell 11 comprises a pressure control portion 22 for supplying hydrogen gas at air pressure in response to a control signal output from the ECU 18 or in response to air pressure supplied from an air compressor 15 as a signal pressure.

The air compressor 15 connected to the air electrode side of the fuel cell 11 not only supplies air to the air electrode, but also supplies air as a signal pressure for the pressure control portion 22 constituted by a pressure flow control valve. In order to execute the above operation, a number of rotations command value N of the motor for controlling the number of rotations of the motor, which drives the air compressor 15, is input into a control portion 23 of the air compressor 15.

The power storage unit 12 is a capacitor such as an electric double-layer capacitor or an electrolytic capacitor. In addition, the fuel cell 11 and the power storage unit 12 are connected in parallel to the driving motor 13, which constitutes an electric load.

FIG. 2 is a diagram showing the main structure of a control device for starting the fuel cell vehicle shown in FIG. 1. The control device is used to prevent an excessive reduction of the terminal voltage of the fuel cell at the time of starting the fuel cell.

A primary precharge portion 16 is disposed at the output side of the power storage unit 12, and a secondary precharge portion 17 is disposed at the output side of the fuel cell 11.

As shown in FIG. 2, the primary precharge portion 16 is constituted by a high voltage switch 16a and a current limiter 16b, and when the current to be supplied to the electric load such as the driving motor 13 becomes large, then the high voltage switch 16a is released, and the current is made to flow through a resistor 16c having a predetermined resistance by closing the current limiter 16b.

Thus, the high voltage switch 16a is provided with relays, which are connected to the respective output terminals of the positive and negative electrodes and are controlled by a control signal output from the ECU 18 for opening and closing the high voltage switch 16a.

The current limiter 16b is provided with relays, which are connected in parallel to the high voltage switch 16a and which are also connected to respective output terminals of the positive and negative electrodes, and a resistor 16c with a predetermined resistance, so that the current output from the power storage unit 12 is supplied to the PDU 14 through the resistor 16c.

The secondary precharge portion 17 is constituted by a DC-DC chopper 17a and a control portion 17b, and controls the output current Ifc from the fuel cell 11 based on the current command value IFCCMD, that is, the generation command to the fuel cell 11.

As shown in FIG. 3, the DC-DC chopper 17a controls the ON/OFF operation of a transistor TR by supplying a pulse current to the base of the transistor TR from the control portion 17b, for example. The control portion 17b controls the output current by changing the duty ratio of the pulse current such that the OFF state of the transistor TR becomes longer with an increase in the output current.

Note that a diode is disposed between the primary charge portion 16 and the secondary charge portion 17 in order to prevent a countercurrent from flowing from the power storage unit 12 to the fuel cell 11.

In addition, as shown in FIG. 1, the control portion 23 of the air compressor 15, in addition to the PDU 14, is connected in parallel to the fuel cell through the secondary precharge portion 17.

A 12-V auxiliary battery 24 for driving various control devices of the fuel cell vehicles and accessory devices is provided with a DC-DC converter 25, for example, which charges the auxiliary battery 24 after reducing the DC voltage supplied from the fuel cell through the secondary precharge portion 17.

In addition, a control device 27 of a motor 26 for driving the air conditioner is connected in parallel with the fuel cell 11 through the secondary precharge portion 17, and the control device 27 converts DC electric power output from the fuel cell 11 and the power storage unit 12 into AC power to be supplied to the motor 26.

The ECU 18 is constituted by a motor ECU 31, a fuel cell control portion 32, and a power storage unit control portion 33, for example.

The motor ECU 31 controls the power conversion operation of the PWM inverter provided in the PDU 14, and outputs switching commands such as a U phase AC voltage command value *Vu, a V phase AC voltage command value *Vv, and a W phase AC voltage command value *Vw. The motor ECU 31 then makes the PDU 14 output a U phase current Iu, a V-phase current Iv, and a W-phase current Iw in response to these voltage command values *Vu, *Vv, and *Vw to respective phases of the driving motor 11.

The motor ECU 31 accepts various input signals, such as a signal of an accelerator operational amount θTh related to an amount of depression of the accelerator by the driver, for example, a signal of a magnetic pole position (electric angle) output from an angular velocity detector 35 provided in the driving motor for detecting the magnetic pole position, signals of the respective phase currents Iu, Iv, and Iw supplied from the PDU 14 to the driving motor 11, a signal of a motor current Imotor as a DC current component, and a signal of a supply voltage Vdc-in supplied to the PDU 14.

The fuel cell control portion 32 outputs the number of rotation command value N as a command for driving the auxiliary devices for driving the fuel cell such as the air compressor 15, and also controls the operations of the primary and secondary precharge portions 16 and 17. That is, the fuel cell control portion 32 controls the operations of the contact points of relays arranged in the high voltage switch 16a and the current controller 16b of the primary precharge portion 16. The fuel cell control portion 32 also outputs a current command value IFCCMD to the DC-DC chopper 17a of the secondary precharge portion 17 as a switching command.

The fuel cell control portion 32 accepts various input signals, such as a signal of an output request value *P for the driving motor 13 and an output value P from the driving motor 13, a signal of a motor current Is/c of a motor for driving the air compressor 15 output from the control portion 23, a signal of the output current Ifc and output voltage Vfc from the fuel cell 11, both output from the secondary precharge portion 17, a DC voltage signal output from the DC-DC chopper 17a of the secondary precharge portion 17, and a signal of an output current value Iout Total output from a current detector 36 disposed between the primary and secondary recharge portions 16 and 17.

The power storage unit control portion 33 calculates the state of charge (SOC) of the power storage unit 12, for example, and outputs the calculation results to the motor ECU 31 and the fuel cell control portion 32.

In order to execute the above operation, the power storage unit 33 accepts signals such as signals with respect to an output current Ist, a voltage Vst between terminals, and a temperature of the power storage unit 12.

That is, as shown in FIG. 2, the ECU 18, which controls the current limiting control of the primary and secondary precharge portions 16 and 17, accepts various signals such as a signal from a first current detector 41 which detects the output current Ist from the power storage unit 12, a signal from a first voltage detector 42 for detecting the terminal voltage Vst between the terminals of the power storage unit 12, a signal from a second current detector 43 for detecting an output current Ifc from the fuel cell 11, a signal from a second voltage detector 44 for detecting an output voltage Vfc of the fuel cell 11, and a signal from a third voltage detector 45 for detecting a motor voltage $V_{MOT}$ of the driving motor 13.

The control device 10 for starting the fuel cell vehicle according to the present embodiment is constituted as described above, and the operations of the control device for starting the fuel cell vehicle, particularly the current limiting control of the primary and secondary precharge portions 16 and 17 are explained below with reference to the attached drawings.

Figure 4:
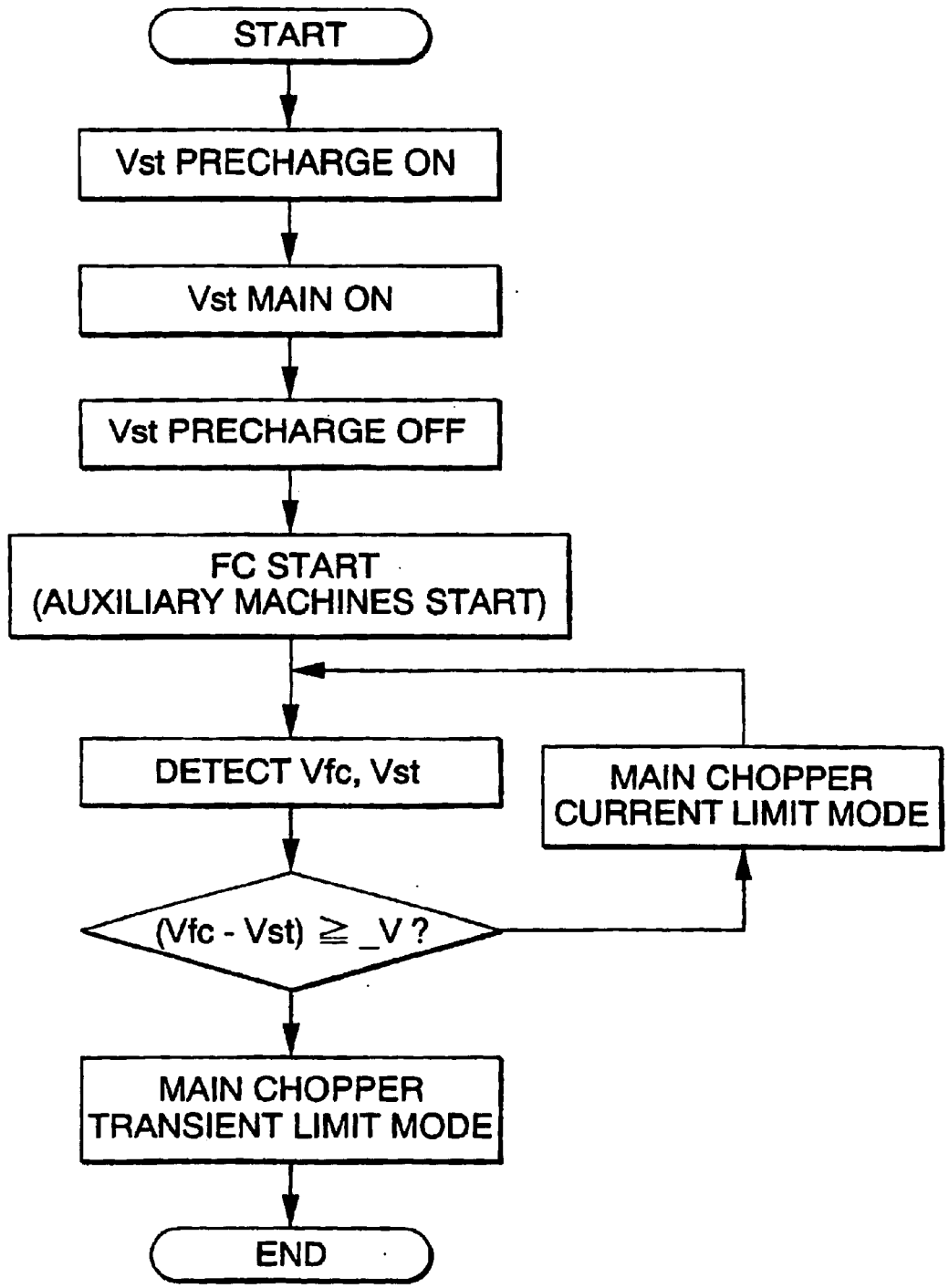
FIG. 4 is a flowchart showing the operation of the control device for starting the fuel cell vehicle shown in FIG. 1.
Figure 5:
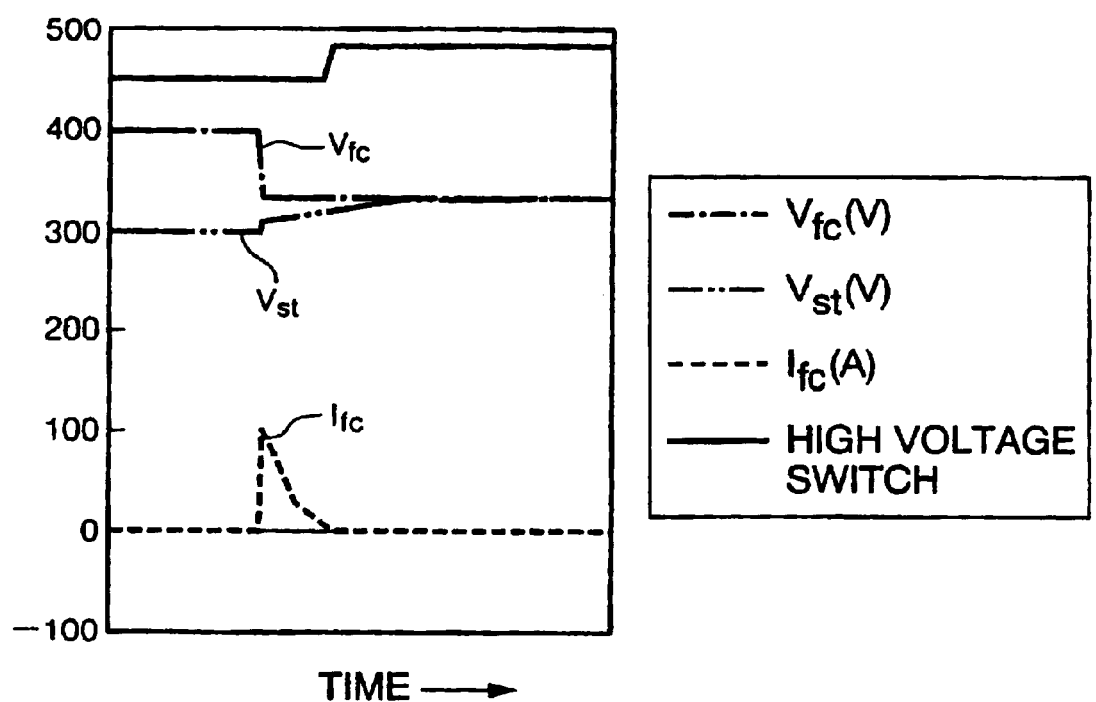
FIG. 5 is a graph showing the time-dependent change of an output voltage Vfc and an output current Ifc of the fuel cell, a terminal voltage Vst of the power storage unit, and a connection flag of the high voltage switch.

FIG. 4 is a flowchart showing the operation of the start control device 10 of the fuel cell vehicle, and FIG. 5 is a graph showing changes of the output voltage Vfc and the output current Ifc of the fuel cell 11, and the terminal voltage Vst of the power storage unit 12 and the connection flag of the high voltage switch 16a.

For example, at the time of starting the vehicle, the fuel cell 11, the power storage unit 12, and the PDU 14 are disconnected from each other, so that the output voltage Vfc, the terminal voltage Vst, and the motor voltage $V_{MOT}$ show individual and different values.

First, in step S01 shown in FIG. 4, a current limiting control is performed by the primary precharge portion 16.

That is, the contact point of each relay of the high voltage switch 16a is opened, and the contact point of each relay in the current limiter 16b is operated such that the current output from the power storage unit 12 is output through a resistor 16c.

Subsequently, in step S02, the contact point of the high voltage switch 16a is actuated, after the motor voltage $V_{MOT}$ and the terminal voltage Vfc reach an equilibrium state, that is, a state where $V_{MOT} \approx Vst \neq Vfc$.

Subsequently, in step S04, the fuel cell 11 is started. That is, the air compressor 15 is started, which is used for supplying air not only to the air electrode of the fuel cell 11 but also to the pressure control portion 22 as a signal pressure for supplying fuel to the fuel cell 11; thus, the energy of the power storage unit 12 is gradually reduced.

Subsequently, in step S06, it is determined whether a value obtained by subtracting the terminal voltage Vst of the fuel cell 11 from the output voltage Vfc of the fuel cell 11 is higher than a predetermined voltage difference ΔV.

If the determination is "YES", then the flow proceeds to step S07, wherein the current control process steps after step S05 are carried out by limiting the current output from the DC-DC chopper 17a to a value lower than the predetermined value.

In contrast, if the determination in step S06 is "NO", the flow proceeds to step S08, wherein a transient control mode is set, that is, the current output from the DC-DC chopper 17a of the secondary precharge portion 17 is set to a value corresponding to the amounts of hydrogen gas and air to be supplied to the fuel cell 11. The series of control processes are completed.

That is, for example, as shown in FIG. 5, when controlling the output current Ifc of the fuel cell 11 by the DC-DC chopper 17a of the secondary precharge portion 17, it is possible to adjust the time required for the output voltage Vfc of the fuel cell 11 and for the terminal voltage Vst of the power storage unit 12 to reach the equilibrium voltages ($V_{MOT} \approx Vst \neq Vfc$) by changing the duty ratio of the switching command input into the DC-DC chopper 17a.

As described above, according to the control device 10 for starting the fuel cell vehicle, at the time of starting the fuel cell 11, the current is output from the power storage unit 12 through a resistor 16c by the primary precharge portion 16 disposed at the output side of the power storage unit 12, and it is possible to prevent generation of an in-rush current, corresponding to a large current rapidly flowing in a capacitor (for example, an electrolytic capacitor as shown in FIG. 1), which is provided in the control portion 23 of the PDU 14 or the air compressor 15, or provided at the input side of the DC-DC converter 25.

In addition, after the load side voltage of the motor voltage $V_{MOT}$ becomes approximately the same as that of the terminal voltage Vst, by limiting the output current Ifc of the fuel cell 11 via the secondary precharge portion 17, it is possible to prevent a large current from rapidly flowing to the power storage unit 12, whose terminal voltage Vst is reduced by supplying power to the auxiliary devices for driving the fuel cell 11 such as the air compressor 15, and, therefore, it is possible to prevent an excessive reduction of the output voltage Vfc of the fuel cell 11 in the course of conversion of the terminal voltage Vst of the power storage unit 12 into an equilibrium voltage.

In addition, the use of the DC-DC chopper 17a in the secondary precharge portion 17 allows for easy control of the output current of the fuel cell 11 by changing the duty of the pulse current input for controlling the chopping operation, and it is possible to reduce the time for the output voltage Vfc of the fuel cell 11 and the terminal voltage of the power storage unit 12 to reach an equilibrium voltage, while preventing an excessive reduction of the output voltage Vfc of the fuel cell 11.

Even when the difference between the output voltage Vfc of the fuel cell 11 and the terminal voltage Vst of the power storage unit 12 is large, the use of the DC-DC chopper 17a of the present embodiment is far more advantageous than the use of a contact point switch system such as the primary precharge portion 16 for outputting the current through the resistor 16c which switches the contact points to change the output path. This is because in the DC-DC chopper, there is no need to be concerned about the malfunction of the switching device resulting from arc welding of the contact points when releasing the contact points.

In the present embodiment, a chopper system using the DC-DC chopper is used as the current limiting circuit. However, the system for performing the current limiting control is not limited to the chopper system, and a variant such as a transistor-type current limiting circuit, or a depletion-type FET system current limiting circuit can be used.

A described above, the first aspect of the present invention provides a control device for starting a fuel cell vehicle, and is capable of preventing a rapid reduction of the terminal voltage of the fuel cell by providing a current limiting device for limiting output current at the time of starting the fuel cell.

That is, it is possible to prevent an inflow of a large current from the fuel cell to the power storage unit whose terminal voltage has been reduced by consumption of energy for driving the fuel cell. While the limited current gradually charges the power storage unit, the terminal voltage of the power storage unit and the terminal voltage of the fuel cell are gradually converted into an equilibrium voltage with respect to each other. Thus, the evaporation of hydrogen or of the water content, or a decrease in the durability of the fuel cell can be prevented, so that the control device of the present invention contributes to lengthening the service life of the fuel cell.

What is claimed is:

1. A control apparatus for starting a fuel cell vehicle comprising:

a fuel cell for supplying electric power to a load;

a capacitor for assisting a supply of electric power to said load and for storing generated energy by said fuel cell;

a fuel cell driving device for supplying reaction gases and for driving said fuel cell; and a current limiting device for limiting an output current from said fuel cell;

wherein, at the time of starting the fuel cell, said capacitor supplies electric energy to said fuel cell driving device and said current limiting device prohibits said fuel cell from outputting an output current until an output voltage of said fuel cell reaches a predetermined voltage, and wherein, after said output voltage rises to more than the predetermined voltage, said current limiting device limits said output current of said fuel cell to below a predetermined current value until a difference between said output voltage of said fuel cell and a terminal voltage of said capacitor reaches a predetermined voltage difference.

* * * * *